US008442870B1

(12) United States Patent
Homan

(10) Patent No.: US 8,442,870 B1
(45) Date of Patent: May 14, 2013

(54) SYSTEMS AND METHODS FOR SELLING OR OFFERING PAPER OR ELECTRONIC GREETING CARDS ON THE INTERNET

(71) Applicant: Glen A. Homan, Arlington, VA (US)

(72) Inventor: Glen A. Homan, Arlington, VA (US)

(73) Assignee: PaperCardShop.com LLC, Arlington, VA (US)

( * ) Notice: Subject to any disclaimer, the term of this patent is extended or adjusted under 35 U.S.C. 154(b) by 0 days.

(21) Appl. No.: 13/679,540

(22) Filed: Nov. 16, 2012

Related U.S. Application Data

(60) Provisional application No. 61/685,894, filed on Mar. 27, 2012, provisional application No. 61/629,545, filed on Nov. 21, 2011.

(51) Int. Cl.
*G06Q 30/00* (2006.01)
(52) U.S. Cl.
USPC ............................................. 705/26.1
(58) Field of Classification Search .................. 705/26.1
See application file for complete search history.

(56) References Cited

U.S. PATENT DOCUMENTS

| | | | | |
|---|---|---|---|---|
| 2002/0022996 | A1* | 2/2002 | Sanborn et al. | 705/14 |
| 2008/0091526 | A1* | 4/2008 | Shoemaker | 705/14 |
| 2012/0284623 | A1* | 11/2012 | Soderstrom | 715/719 |

OTHER PUBLICATIONS http://www.hallmark.com (Screenshots of website accessed Nov. 16, 2012), 4 pages.
http://www.americangreetings.com (Screenshots of website accessed Nov. 16, 2012), 3 pages.
http://www.jackcards.com (Screenshots of website accessed Nov. 16, 2012), 3 pages.
www.greetingcarduniverse.com (Screenshots of website accessed Nov. 16, 2012), 3 pages.
www.papercards.com (Screenshots of website accessed Nov. 16, 2012), 3 pages.
http://www.cardsdirect.com (Screenshots of website accessed Nov. 16, 2012), 3 pages.
http://www.papyrusonline.com (Screenshots of website accessed Nov. 16, 2012), 3 pages.
http://www.leanintree.com (Screenshots of website accessed Nov. 16, 2012), 3 pages.
http://www.greetz.com (Screenshots of website accessed Nov. 16, 2012), 3 pages.
http://www.cardgtore.com (Screenshots of website accessed Nov. 16, 2012), 3 pages.
http://www.paperlesspost.com (Screenshots of website accessed Nov. 16, 2012), 3 pages.

\* cited by examiner

*Primary Examiner* — Mila Airapetian
(74) *Attorney, Agent, or Firm* — Pillsbury Winthrop Shaw Pittman LLP

(57) ABSTRACT

A system and method for generating a greeting card selection interface is provided. In some embodiments, the greeting card selection interface may be used to electronically sell or offer paper greeting cards or electronic greeting cards. The greeting card selection interface may overcome design challenges and improve the shopping experience by allowing the user to shop for cards in a quicker and more intuitive fashion, reducing the time that the user needs to select one or more cards of interest while providing appropriate detail that consumers of greeting cards typically require before making a purchase. Various improvements to the shopping experience include sizing, formatting (including layout), positioning, obtaining appropriate images, and obtaining information related to greeting cards that optimize the electronic shopping experience.

22 Claims, 9 Drawing Sheets

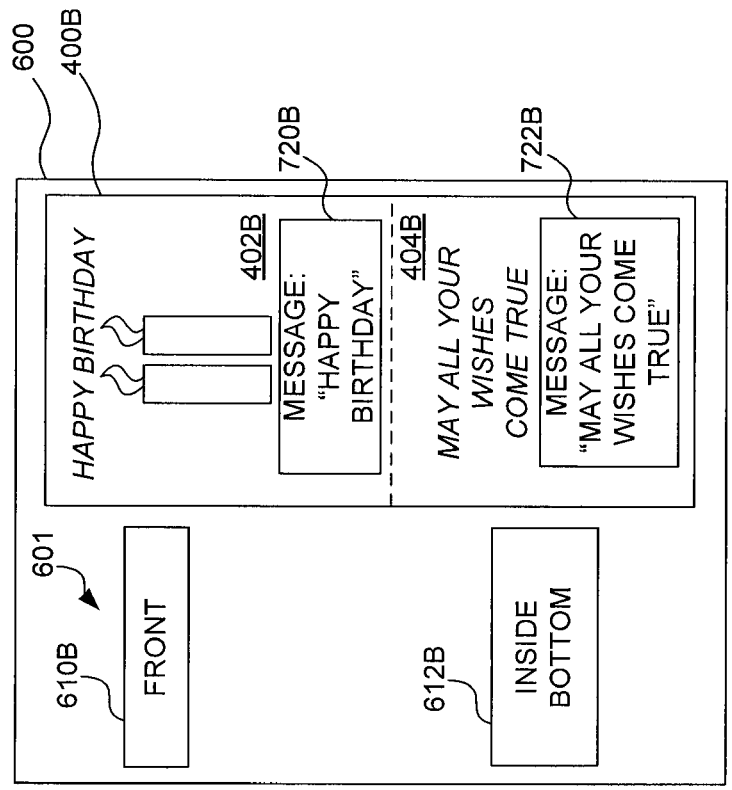
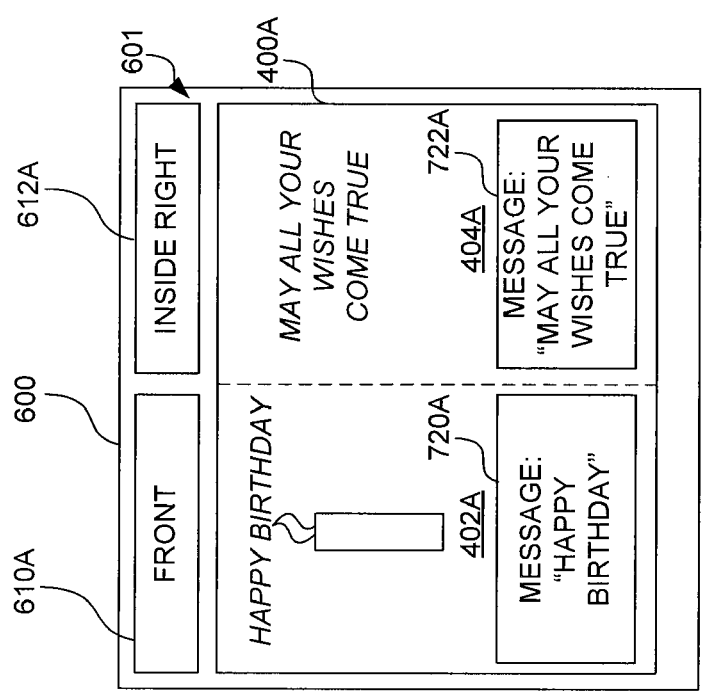
FIG. 7B
FIG. 7A

SYSTEMS AND METHODS FOR SELLING OR OFFERING PAPER OR ELECTRONIC GREETING CARDS ON THE INTERNET

CROSS-REFERENCE TO RELATED APPLICATIONS

This Application claims priority to U.S. Provisional Patent Application Ser. No. 61/629,545, filed Nov. 21, 2011, entitled, "Systems and Methods for Selling Paper Greeting Cards on the Internet," and U.S. Provisional Patent Application Ser. No. 61/685,894, filed Mar. 27, 2012, entitled, "Systems and Methods for Selling or Offering Paper Greeting Cards or Electronic Facsimiles of Paper Greeting Cards on the Internet," both of which are incorporated by reference herein in their entirety.

FIELD OF THE INVENTION

The invention relates to selling or offering greeting cards such as paper greeting cards and/or electronic greeting cards on the Internet via a card selection interface having enhanced rollover imaging using an algorithmically determined layout, position, and size.

BACKGROUND OF THE INVENTION

The Internet has made online commerce commonplace for various items such as products and services. However, even though various online retailers sell paper greeting cards, sales of paper greeting cards on the Internet are small compared to sales in physical stores. Although precise statistics are unavailable, some estimates suggest that online sales of paper greeting cards may account for only one or two percent of total sales. One reason for the lack of online penetration may include the difficulty of designing appropriate interfaces that give the consumer a satisfactory shopping experience. Consumers may typically browse through several cards in-store before making a purchase.

As such, what is needed is an improved greeting card selection interface that enhances the user experience to increase the penetration of online shopping for greeting cards. These and other problems exist.

SUMMARY OF THE INVENTION

The invention addressing these and other drawbacks relates to a system and method for generating a greeting card selection interface. In some embodiments, the greeting card selection interface may be used to sell or offer greeting cards. The greeting card selection interface may overcome design challenges and improve the shopping experience by allowing the user to shop for cards in a quicker and more intuitive fashion, reducing the time that the user needs to select one or more cards of interest while providing appropriate detail that consumers of greeting cards typically require before making a purchase.

In some implementations, the system may include a computer that generates, collects, and stores various images or other facsimiles of greeting cards such as thumbnail images and rollover images. The computer may format the rollover images using various algorithms that optimize the user experience or otherwise obtain the rollover images and generate a card selection interface that includes the thumbnail images, the rollover images, and/or links to the rollover images. In some implementations, the computer may be programmed with computer program modules. The computer program modules may program the computer to perform various functions and features described herein.

In some embodiments, the computer may be programmed with an image capture module, which may capture or otherwise obtain the front, inside, back, and/or other perspective of a greeting card. The various perspective images may be further processed into thumbnail images, rollover images, and/or other suitable images as described herein.

In some embodiments, the computer may be programmed with an image layout module, which may determine or otherwise obtain a layout for the rollover image. The layout for the rollover image may be based on the type of greeting card that is imaged. For example, for a vertical card (one in which the orientation of the greeting card as it is intended to be read has a height generally larger than a width), the rollover image may be laid out in a side-by-side layout such that an image of the front of the card is laid out next to an image of the inside of the card. On the other hand, for a horizontal card (one in which the orientation of the greeting card as it is intended to be read has a height generally smaller than a width), the rollover image may be laid out in a top-to-bottom layout such that an image of the front of the card is laid out on top of an image of an image of the inside of the card.

In some embodiments, the computer may be programmed with a card positioner module, which may determine a position on the card selection interface that the rollover image should occupy. Image position module may algorithmically determine a placement of the position of a rollover image based on various factors such as a size, orientation, and position of underlying thumbnail images and/or size of the rollover image itself.

In some embodiments, the computer may be programmed with an image sizing module, which may determine a size for the rollover image. Image sizing module may algorithmically optimize a size for the rollover image based on various constraints such as overall available space. In some embodiments, image sizing module may determine the largest size that is feasible while maintaining aesthetics and good practices for interface design.

In some embodiments, the computer may be programmed with a composite image module, which may generate or otherwise obtain a composite image for the rollover. For example, composite image module may process or otherwise obtain two or more images (such as front and inside images of a greeting card) into a composite image so that the rollover image includes the composite image rather than individual images.

In some embodiments, the computer may be programmed with a caption module, which may obtain various captions for the rollover image. For example, a system administrator or other entity may input captions to be included with the rollover image. In some embodiments, different captions may be placed on different portions of a composite image to indicate, for example, the front, inside, or other perspective that the corresponding portion of the composite image conveys.

In some embodiments, the computer may be programmed with a message module, which may obtain text content included in the greeting card. In some embodiments, message module may receive the text content from a manufacturer of the greeting card. In some embodiments, message module may obtain the text content via optical character recognition. In some embodiments, message module may obtain the text content from the system administrator. Each text content may be associated with a front, inside, or other perspective of the greeting card.

In some embodiments, the computer may be programmed with a highlight module, which may capture, track, and store highlight selections from the user. A highlight selection allows the user to indicate an interest in a greeting card (thereby highlight the card) such that the user may navigate away from a particular interface page having the greeting card of interest and then return to the page with the greeting card of interest highlighted to indicate the prior interest. Highlight module may store the highlight preference in a user database in order to track user interests in order to determine and suggest particular greeting cards that may be of interest to the user based on highlighted cards. In some embodiments, the stored highlights also allow the user to terminate the user interface session and generate a new user interface session at a later time such that the new user interface session can display the highlighted greeting cards.

In some embodiments, the computer may be programmed with a descriptor module, which may annotate a quantity descriptor of a greeting card such as whether the greeting card is sold in boxes. In some embodiments, the quantity descriptor may indicate that the greeting card is sold in boxes of a particular quantity.

In some embodiments, the computer may be programmed with a card selection interface module, which may generate a card selection interface based on the thumbnail images, rollover images, various formatting modules (e.g., layout, positioning, and sizing modules), composite images, captions, highlights, and type annotations. The card selection interface may provide an enhanced and optimized user experience for customers shopping for paper greeting cards and/or facsimiles thereof.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

BRIEF DESCRIPTION OF THE DRAWINGS

FIGS. 7A-7B illustrate examples of a rollover canvas, according to an aspect of the invention.

DETAILED DESCRIPTION OF THE INVENTION

Various systems, methods, and computer program products for selling or offering greeting cards or facsimiles thereof are provided. In some embodiments, the system may be used to sell or offer greeting cards such as paper greeting cards and/or electronic greeting cards via a card selection interface. The system may overcome design challenges and improve the shopping experience by allowing the user to shop for cards in a quicker and more intuitive fashion, reducing the time that the user needs to select one or more cards of interest while providing appropriate detail that consumers of greeting cards typically require before making a purchase. Other uses and implementations of the system will be apparent based on the disclosure.

"Images" of greeting cards may include photographs, renditions, and/or other reproductions that indicate an appearance of the greeting card being imaged. A greeting card may include a physical medium greeting card (e.g., a paper greeting card) or an electronic greeting card. As used herein, the terms "top," "left," "right," "bottom," "horizontal," and "vertical" are intended to convey directionality with respect to how a user is intended to view the card selection interface or other display while standing upright (and facing the card selection interface or other display).

Figure 1:
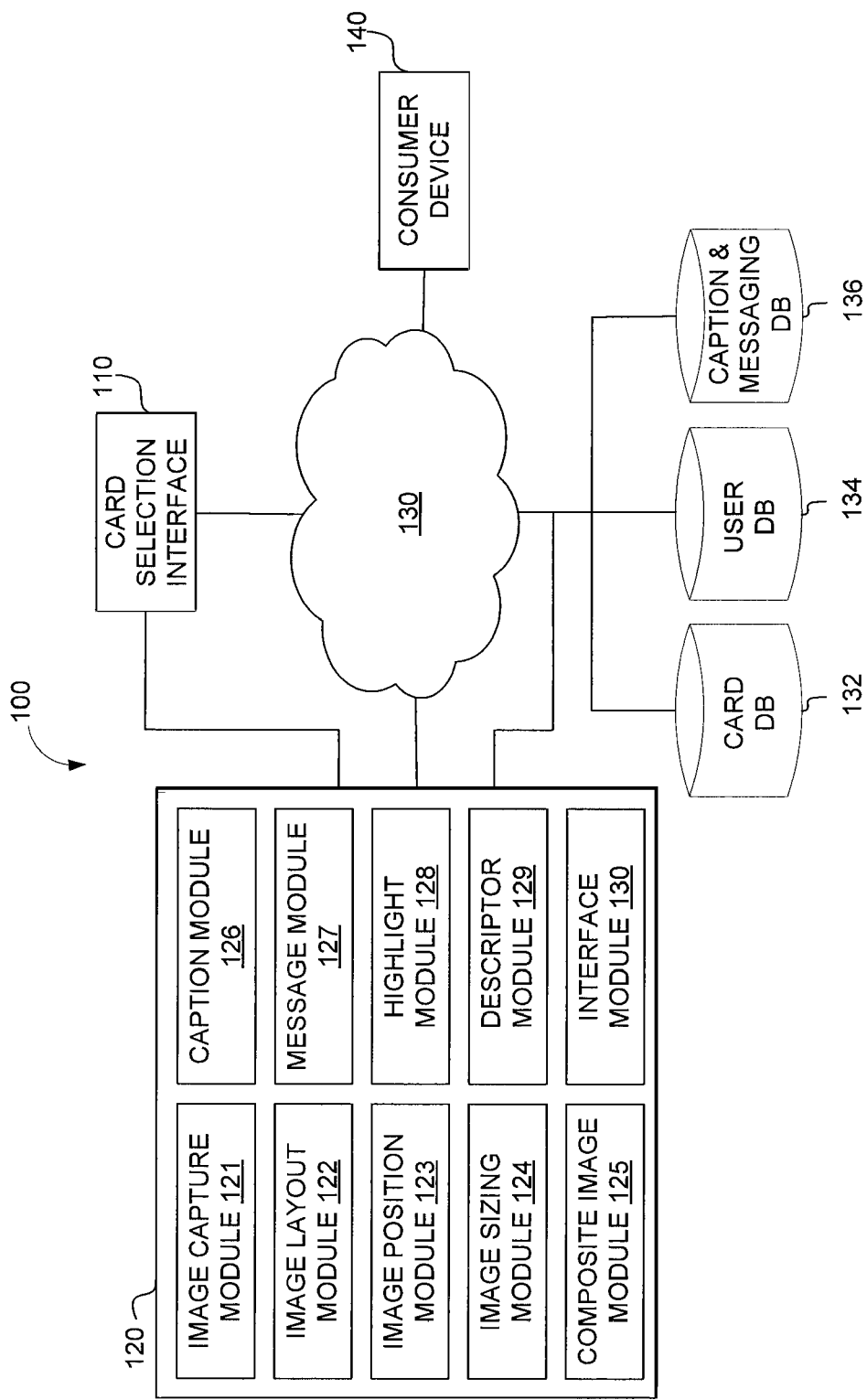
FIG. 1 illustrates a system of generating a card selection interface, according to an aspect of the invention.

FIG. 1 illustrates a system 100 of generating a card selection interface, according to an embodiment of the invention. System 100 may include a computer 120 that generates a card selection interface 110, a greeting card database 132, a user database 134, a caption and messaging database 136, and a client 140. Each of the system components may communicate with one another or be accessible via a network 103 such as the Internet and/or other communication channel that can be used by the various components to communicate with one another.

Generally speaking, card selection interface 110 may include thumbnail images of greeting cards so that a user may peruse multiple greeting cards at once. A thumbnail image includes a small image of the front and/or other perspective of the greeting card. A thumbnail image may be displayed as part of a thumbnail ensemble, which includes the thumbnail image and information related to the greeting card associated with the thumbnail image. The information related to the greeting card may include, for example, dimensions, price, and/or other information known or obtained about the greeting card. In some embodiments, card selection interface 110 may include a category page that displays greeting cards by category. In these embodiments, thumbnail images may appear on category pages.

In some embodiments, a thumbnail image and/or portions of the thumbnail ensemble may be rolled over to reveal a rollover image. The rollover image may appear when the user positions a cursor over or nearby the thumbnail image and/or portions of the thumbnail ensemble. "Rolled over," "position a cursor" and similar language includes hovering over, mousing over, selecting, clicking, or otherwise indicating an interest in a graphical object using user interface components such as a mouse, a touch screen, and/or other user interface components. In some embodiments, the user does not need to click on the thumbnail image for the rollover image to appear or disappear. In some embodiments, the rollover image may be coded into card selection interface 110 on which the rollover image appears. In some embodiments, the rollover image is communicated along with card selection interface 110 and is invoked at the client via JAVASCRIPT or similar scripting language that is included with card selection interface 110. In some embodiments, the rollover image is communicated after card selection interface 110 is communicated such as by using ASYNCHRONOUS JAVASCRIPT AND XML or similar asynchronous scripting language to retrieve the rollover image.

In some embodiments, the rollover image may be placed within a canvas (also referred to herein as "rollover canvas"), which may include an area that houses the rollover image. The background of the canvas may be white, colored, or transparent. In some embodiments, the canvas may be shaped as a rectangle or other shape. The canvas may be outlined with a hairline outline, which may bound the canvas and be colored or transparent. In some embodiments, the rollover image includes a single composite image of two or more images each depicting different views of a greeting card. In other embodiments, the rollover image may include two or more separate images each depicting a different view of the greeting card. For example, the rollover may include a front of the greeting card and the inside of the greeting card. Other combinations and number of images of the different views of the greeting card may be used as well. The layout, positioning, and/or sizing of the rollover image may be algorithmically determined to optimize the user experience as described herein.

In some embodiments, the system may include a computer 120 that generates, collects, and stores various images or other facsimiles of greeting cards such as thumbnail images and rollover images. Computer 120 may format or otherwise obtain the rollover images using various algorithms that optimize the user experience and generate card selection interface 110, which may include the thumbnail images, the rollover images, and/or links to the rollover images.

In some embodiments, computer 120 may comprise one or more computing devices programmed with various computer program modules that enable the features and functions described herein. The computer program modules may include an image capture module 121, an image layout module 122, an image position module 123, an image sizing module 124, a composite image module 125, a caption module 126, a message module 127, a highlight module 128, a descriptor module 129, an interface module 130, and/or other modules.

In some embodiments, image capture module 121 may capture the front, inside, back, and/or other perspective of a greeting card. The various perspective images may be further processed into thumbnail images, rollover images, and/or other suitable images as described herein. The images may be received from a manufacturer of the greeting card, an imaging device (not illustrated in FIG. 1) such as a camera, and/or received from other computing devices. In some embodiments, image capture module 121 may generate a thumbnail image, which may include a small image of the front or other perspective of the greeting card. Image capture module 121 may store the captured images in card database 132. Thumbnail images may appear on category pages, which may include thumbnail images of greeting cards based on a category of greeting cards such as "Birthday," "Anniversary," "Graduation," etc.

In some embodiments, image layout module 122 may determine or otherwise obtain a layout for the rollover image. The layout for the rollover image may be based on the type of greeting card that is imaged. Types of greeting cards may include, for example, a vertical card, a horizontal card, a square card, and cards with unusual architecture. The different types may be associated with different rules for formatting them. For example and without limitation, for a vertical card (one in which the orientation of the greeting card as it is intended to be read has a height generally larger than a width), the rollover image may be laid out in a side-by-side layout such that an image of the front of the card is laid out next to an image of the inside of the card. On the other hand, for a horizontal card (one in which the orientation of the greeting card as it is intended to be read has a height generally smaller than a width), the rollover image may be laid out in a top-to-bottom layout such that an image of the front of the card is laid out on top of an image of an image of the inside of the card.

In some embodiments, square cards may be formatted based on formatting rules for vertical cards (or horizontal cards) according to particular needs. In some embodiments, cards with unusual architecture may include a popup card, a multi-fold (e.g., tri-fold) card, and/or other types of cards that are not horizontal, vertical and square cards. For these types of cards, the canvas that encompasses the rollover image for the cards with unusual architecture may determine which formatting rule is used. For example, an irregular card whose rollover image canvas has a generally vertical card-like orientation will use vertical formatting rules and an irregular card whose rollover image canvas has a horizontal card-like orientation will use horizontal formatting rules.

Other combinations and number of images of the different views of the greeting card may be used as well. For example, a rollover image may include 1) a front and back of the card, 2) a front, inside, and back of the card, 3) an inside and back of the card, 4) a front and inside-right half of card, 5) a front and inside-bottom half of card and/or other combinations of views of the card.

In some embodiments image position module 123 may determine a position on the card selection interface that the rollover image should occupy. Image position module may algorithmically determine an optimal placement of the position of a rollover image based on various factors such as a size, orientation, and position of underlying thumbnail images and/or size of the rollover image itself.

In some embodiments, image position module 123 may position the rollover image in relation to its associated thumbnail image. The positioning may result in a more efficient, more intuitive, and more satisfying user experience. In some embodiments, image position module 123 positions the rollover image in a manner that the rollover image can be as large as feasible, given the constraints of good design and best practices.

In some embodiments, image position module 123 may position the rollover image based on a set of instructions. The instructions may include that the rollover may not always appear in the same place relative to the thumbnail. For example, if the thumbnail is near the top of the computer screen, the rollover is positioned differently than if it is near the bottom of the screen. The instructions may further include that the rollover should not partially or fully cover the thumbnail with which it is associated in order to avoid confusion on the part of the user. The instructions may include that if a right border of the thumbnail image is to the left of a center of the computer screen (or card selection interface 110), then the rollover image should be positioned adjacent the right border of the thumbnail image. The instructions may include that if a left border of the thumbnail image is to the right of a center of the computer screen (or card selection interface 110), then the rollover image should be positioned adjacent the left border of the thumbnail image.

In some embodiments, image position module 123 may position the rollover image within a pane, which may have a predefined height and/or width. In these embodiments, the thumbnail may have a height and/or a width that is less than the height and/or width of the pane. In some embodiments, the thumbnail may be centered within the pane. In some embodiments, the rollover image may be positioned adjacent to either the right or left border of the pane, not the thumbnail image.

Figure 8A:
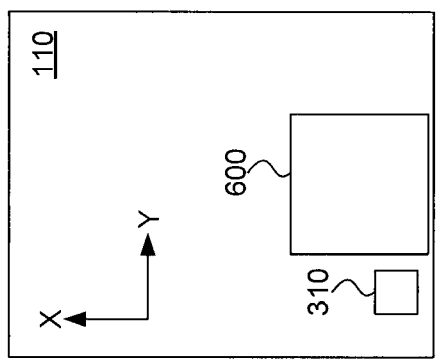
FIGS. 8A-G illustrate examples of a card selection interface having a thumbnail ensemble and a corresponding rollover canvas, according to an aspect of the invention.
Figure 8B:
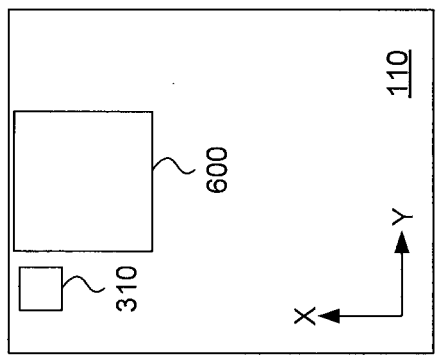
Figure 8C:
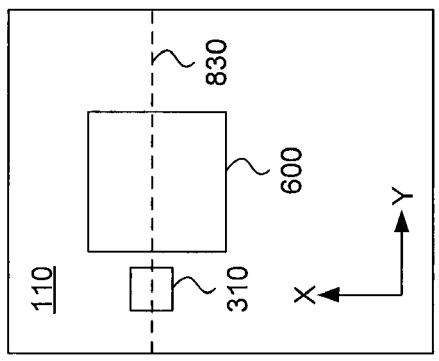

The instructions may include that, to the extent possible, the rollover image is centered vertically with respect to the thumbnail. By "centered vertically," it is meant that if a horizontal line were drawn through the vertical center of the thumbnail and extended through the rollover canvas, it would bisect the rollover canvas (as illustrated in FIG. 8A). The instructions may include that for thumbnails near the top of the screen (or card selection interface 110), the rollover needs to be lower, relative to the thumbnail (as illustrated in FIG. 8B). The particular number of pixels by which the rollover is lowered may be based on the thumbnail size, the rollover image size, and/or may be predefined. The instructions may include that for thumbnails near the bottom of the screen (or card selection interface 110), the rollover needs to be higher, relative to the thumbnail (as illustrated in FIG. 8C). "Near the top" or "near the bottom" may include a threshold and predetermined distance such as a particular number of pixels from a top or bottom of the screen or card selection interface 110.

In some embodiments, image sizing module 124 may determine a size for the rollover image. Image sizing module 124 may algorithmically optimize a size for the rollover image based on various constraints such as overall space available. In some embodiments, image sizing module may determine the largest size that is feasible while maintaining aesthetics and good practices for interface design.

According to an embodiment of the present disclosure, image sizing module 124 may determine the size of the rollover image based on a set of instructions or otherwise obtain the rollover image already pre-sized. The instructions cause the size of the rollover image to be as large as feasible, given the requirements of the good interface design. The benefit of this algorithm is that the larger the image of the card, the easier it is for the user to determine how the actual card looks. In particular, the text or message on the card can be difficult to read if the image of the card is too small (although other features described herein may address this problem as well).

The instructions may include that the size of the rollover canvas varies depending on the size of the rollover, or composite, image, and/or the type of greeting card (e.g., horizontal, vertical, etc.). Composite images may be proportional in size to the sizes of the actual cards. For example, the composite image of a 7"×5" card is larger than a composite image of a 6.25"×4.5" card.

The instructions may include an objective that attempts to maximize a size of the rollover image consistent with good design. The maximum-size image for vertical cards may be based on a physical card that is seven inches high and five inches wide. The maximum-size image for horizontal cards may be based on a card that is five inches high and seven inches wide. Five inches by seven inches is the largest commonly used paper greeting-card size, although other sizes and corresponding maximum sizes may be used.

Figure 9B:
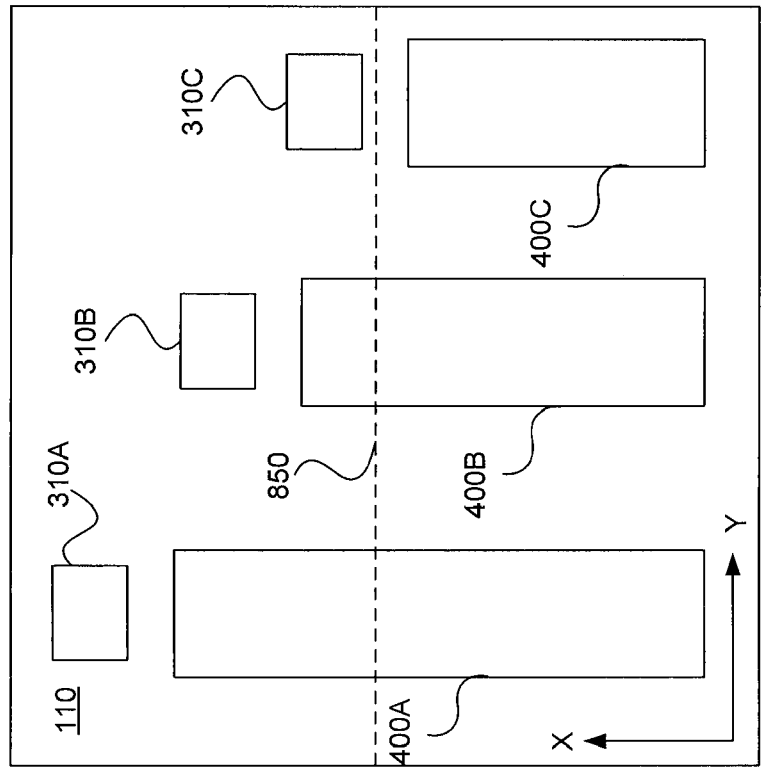
FIGS. 9A and 9B illustrate examples maximum sizing for rollover canvases, according to an aspect of the invention.
Figure 9A:
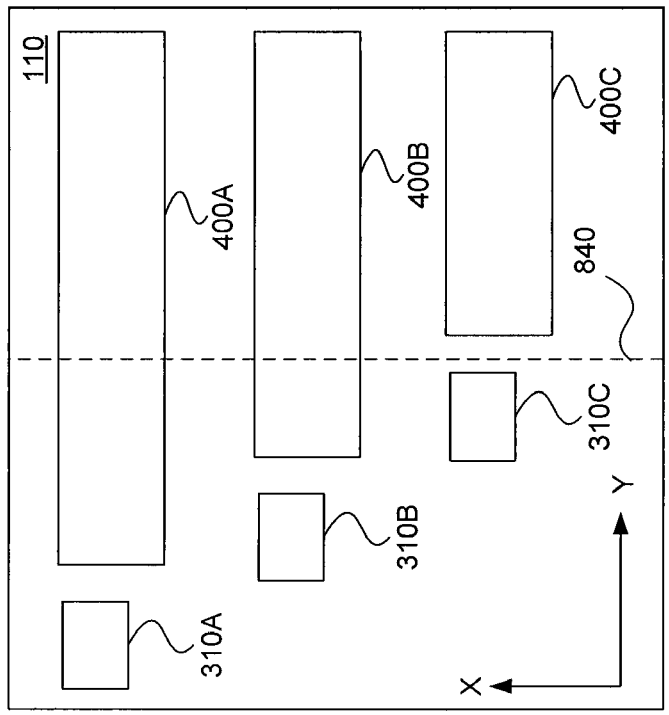

The instructions may specify that a maximum size is based on a position of a thumbnail image associated with a rollover image. Referring to FIG. 9A, for example, thumbnail ensemble 310 may be associated with a rollover image 400. Rollover image 400 may be positioned immediately adjacent to the right side of thumbnail ensemble 310 as illustrated (or to the left side of thumbnail ensemble). Based on the position of thumbnail ensemble 310, a corresponding maximum width of the rollover image 400 may be determined.

In some embodiments, the maximum size is kept uniform for all thumbnail ensembles of a card selection interface even though one thumbnail may be positioned such that it may accommodate a larger rollover image than another thumbnail image. For example, although thumbnail ensemble 310A may accommodate a larger rollover image than thumbnail ensemble 310C, the maximum size of the rollover image for thumbnail ensemble 310A may be limited to the maximum size of the rollover image for thumbnail ensemble 310C. An analogous maximum height may be determined in implementations where the thumbnail ensemble 400 is positioned adjacent to a bottom side of thumbnail ensemble 310 as illustrated in FIG. 9B (or adjacent to a top side of thumbnail ensemble 310).

In some embodiments, because different types of cards (e.g., horizontal, vertical, etc.) have different layouts, different sizing constraints may be imposed on rollover images depending on the type of greeting card. For example, vertical cards have a width of the canvas that is greater than the height of the canvas while horizontal cards have a height of the canvas that is the greater than the width of the canvas. Horizontal cards theoretically have no constraint on the height of the canvas, as the rollover image could theoretically extend indefinitely down the page (though the part below the bottom of the computer screen would not be visible). On the other hand, a width of the canvas for vertical cards may be constrained by the width of the page.

In some embodiments, the instructions may include that the maximum height of the rollover canvas for horizontal cards is the same as the maximum width of the rollover canvas for vertical cards.

In some embodiments, composite image module 125 may generate or otherwise obtain a composite image for the rollover. For example, composite image module may process two or more images (such as front and inside images of a greeting card) into a composite image so that the rollover image includes the composite image rather than individual images.

In some embodiments, caption module 126 may obtain various captions for the rollover image. For example, a system administrator or other entity may input captions to be included with the rollover image. In some embodiments, different captions may be placed on different portions of a rollover canvas to indicate, for example, the front, inside, and/or other perspective that the corresponding portion of the rollover image conveys. In some embodiments, different captions may be embedded in different portions of a JPEG rollover image to indicate, for example, the front, inside, and/or other perspective that the corresponding portion of the rollover image conveys.

The purpose of the captions is to provide clarity to the user. The captions may describe the associated image with words such as "Front" or "Inside Right (Blank)." Caption module 126 may position the captions differently for different types of cards, because placing the captions in the same position for all types of cards may confuse the user. However, for various types of cards, whether the captions are placed on a rollover canvas or embedded in a JPEG rollover image, the captions are positioned so that that the user can easily determine the image with which a caption is associated.

Figure 6B:
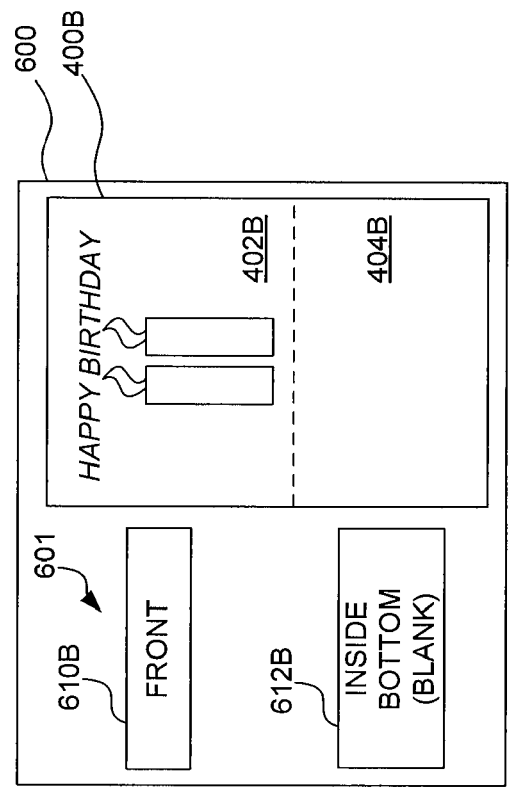
FIGS. 6A-6B illustrate examples of a rollover canvas, according to an aspect of the invention.
Figure 6A:
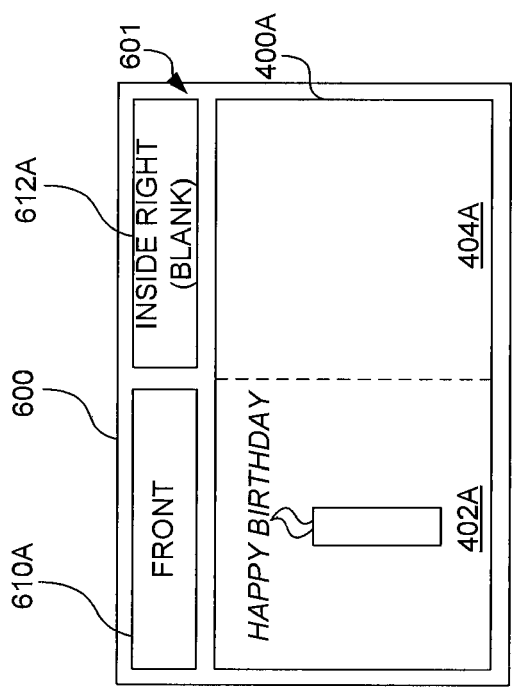

For various types of cards, caption module 126 may position the caption based on the size of a corresponding rollover image and a set of instructions. In some embodiments, the instructions may include that for vertical cards in which the inside-left half has no message or important design elements, the captions may be positioned as illustrated in FIG. 6A (illustrated as captions 610A and 612A). In some embodiments, the instructions may include that for horizontal cards in which the inside-top half has no message or important design elements, the captions may be positioned as illustrated in FIG. 6B (illustrated as captions 610B and 612B). In some embodiments, the captions are not part of the JPEG rollover image but instead are stored in captions and messaging database 136. In this manner, captions may be flexibly added to (e.g, by overlaying onto) rollover canvases without embedding the captions within the JPEG rollover image. In other embodiments, composite image module 125 may embed captions within a rollover image.

For most vertical cards, the inside-left half has no message or important design elements. However, for some vertical cards, the inside-left half does have a message or important design elements. For these cards, the database fields for the front and inside captions may be blank, because the procedures for positioning database-stored captions may not applicable. Instead, the front and inside captions may be embedded in the JPEG rollover image.

For most horizontal cards, the inside-top half has no message or important design elements. However, for some horizontal cards, the inside-top half does have a message or important design elements. For these cards, the database fields for the front and inside captions may be blank, because the procedures for positioning database-stored captions are not applicable. Instead, the front and inside captions may be embedded in the JPEG rollover image.

Cards with unusual architecture may include a tri-fold card and a pop-up card. For these and other types of cards with unusual architecture, a similarly appropriate procedure as described herein may be used to position the captions. For cards with unusual architecture, the database fields for the front and inside captions may be blank, because the procedures for positioning database-stored captions are not applicable. Instead, the front and inside captions may be embedded in the JPEG rollover image.

In some embodiments, message module 127 may obtain text content included in the greeting card. The messages may be stored using caption and messaging database 136. In some embodiments, message module 127 may receive the text content from a manufacturer of the greeting card. In some embodiments, message module may obtain the text content via optical character recognition. In some embodiments, message module may obtain the text content from the system administrator. Each text content may be associated with a front, inside, or other perspective of the greeting card.

In some embodiments, for cards in which the copy or message (of the front, inside of the card, or other location) is in type that is so small that it is difficult or impossible to read, message module 127 may capture the message and cause the message to be repeated at the bottom or other location of the image in type of sufficient size so that the user can easily read it. The reiteration is presented so that it is readily apparent to the user that the reiteration does not appear on the actual card. The reiteration may be embedded in the JPEG rollover image and/or may be presented separately.

A benefit of repeating the message in readable type is that it enables the user to browse cards more quickly. The user does not need to go to another window to see a larger image of the card, in order to read the message. In addition, repeating the message in readable type may make the browsing experience more flowing and enjoyable.

In some embodiments, highlight module 128 may capture, track, and store highlight selections from the user. A highlight selection allows the user to indicate an interest in a greeting card (thereby highlight the card) such that the user may navigate away from a particular interface page having the greeting card of interest and then return to the page with the greeting card of interest highlighted to indicate the prior interest. Highlight module may store the highlight preference in a user database in order to track user interests in order to determine and suggest particular greeting cards that may be of interest to the user based on highlighted cards. In some embodiments, the stored highlights also allow the user to terminate the user interface session and generate a new user interface session at a later time such that the new user interface session can display the highlighted greeting cards.

In some embodiments, the highlight feature allows the user to easily mark and unmark individual thumbnail ensembles. Highlighted thumbnail ensembles remain highlighted if the user goes to other pages on the website and then returns to the category page with the highlighted thumbnail ensembles. Highlighted thumbnail ensembles also remain highlighted if the user goes to another website and then returns, either in the same browser window or in a new browser window. In some embodiments, the highlighted thumbnail ensemble remains highlighted if the user terminates the user interface session and generates a new user interface session at a later time.

A benefit of the highlight feature is that it allows the user to easily and quickly locate and return to thumbnail images of cards that the user is considering purchasing. This feature is especially useful when the category page contains a large number of thumbnails. The highlight feature is more intuitive that a "favorites list" because the thumbnail ensemble associated with the actual thumbnail image that originally generated the user's interest is used to mark the thumbnail. Another benefit is that the user does not need to leave the category page.

In some embodiments, descriptor module 129 may annotate a quantity descriptor of a greeting card such as whether the greeting card is sold in boxes or sold in boxes of a particular quantity. For example, a boxed-card icon may be placed nearby or within a thumbnail ensemble for cards that are sold in boxes. In some embodiments, the icon or other indicator is not part of the thumbnail image and may be stored separately in the card database 132. In other embodiments, composite image module 125 may generate a composite image of the thumbnail and the icon or other indicator. In some embodiments, the height and width of the boxed icon is approximately one-third the height and width of the panes (in which the thumbnails are centered). Descriptor module 129 may determine whether to place the icon in a thumbnail pane based on the value of a quantity descriptor field in card database 132.

In some embodiments, the boxed icon may be positioned in the bottom-right corner of the pane (in which the thumbnail may be centered), as opposed to being superimposed entirely on the thumbnail image. Positioning the boxed icon in this manner causes the boxed icon to cover less of the thumbnail image. A benefit of utilizing a visual icon is that the user can easily and quickly determine that the card is sold in boxes. Such a visual icon communicates more effectively than text. In addition, this feature may provide an easy way to display both cards sold singly and cards sold in boxes on the same category page, as opposed to having separate category pages for each.

In some embodiments, card selection interface module 130 may generate a card selection interface 110 based on the thumbnail images, rollover images, various formatting modules (e.g., layout, positioning, and sizing modules), composite images, captions, highlights, and type annotations. The card selection interface 110 may provide an enhanced and optimized user experience for customers shopping for paper greeting cards and/or facsimiles thereof.

A customer may use consumer device 140 to receive card selection interface 110 via a web browser, a mobile application, and/or other application executing on consumer device 140 that can cause the card selection interface to be displayed.

In some embodiments, computer 120 may cause card selection interface 110 to be pre-programmed with the layout, sizing, positioning, rollover images, thumbnail images, and/or other features described herein such that consumer device 140 may simply render the interface. For example, card selection interface 110 may include a webpage having markup language and various scripting languages encoded thereon that instructs the client to render card selection interface 110. In some embodiments, card selection interface 110 may be communicated as instructions for an application such as a mobile application executing at consumer device 140 (which may include a mobile device such as a smartphone).

In some embodiments, at least some of the functions of the foregoing computer program modules of computer 120 may be performed at consumer device 140. For example, computer 120 may include instructions that cause consumer device 140 to determine positioning, sizing, and/or layout of rollover images based on what is currently on-screen. In this example, the position and/or size may depend on a screen resolution of consumer device 140 and/or may depend on the content of card selection interface 110 that is currently being viewed or was scrolled to by a user.

Those having skill in the art will recognize that computer 120 and consumer device 140 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 120 and/or consumer device 140. In one implementation, computer 120 and consumer device 140 may each comprise a server device, a desktop computer, a laptop, a cell phone, a smart phone, a Personal Digital Assistant, a pocket PC, or other device.

Network 130 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), or other network.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The foregoing description of the various components comprising system 100 is exemplary only, and should not be viewed as limiting. The invention described herein may work with various system configurations. Accordingly, more or less of the aforementioned system components may be used and/or combined in various implementations.

Figure 2:
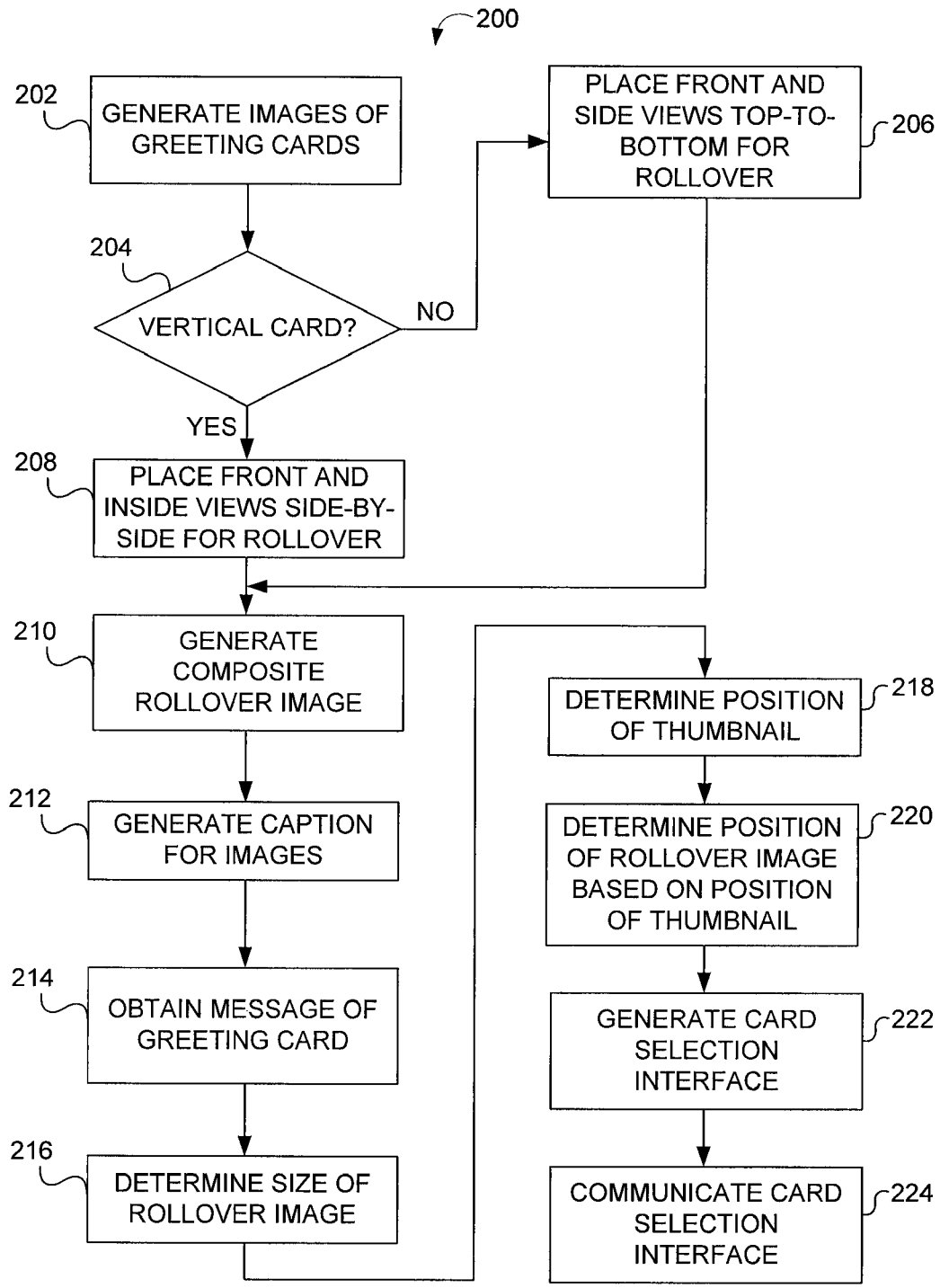
FIG. 2 illustrates a process for generating a card selection interface, according to an aspect of the invention.

FIG. 2 illustrates a process 200 for generating a card selection interface, according to an aspect of the invention. The various processing operations and/or data flows depicted in FIG. 2 (and in the other drawing Figures) are described in greater detail herein. The described operations may be accomplished using some or all of the system components described in detail above and, in some embodiments, various operations may be performed in different sequences. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, process 200 may include obtaining images of greeting cards. The images may include front, inside, back, and/or other views of the greeting cards. In an operation 204, process 200 may include determining whether a greeting card is a vertical greeting card. In some embodiments, cards with unusual architecture (e.g., cards not being horizontal, square, or vertical) may be treated as a vertical or horizontal card based on the overall dimensions of a box or rectangle that bounds the irregular card. In some embodiments, square greeting cards may be treated as vertical greeting cards. In other embodiments, square greeting cards may be treated as horizontal greeting cards. In some embodiments, operation 204 may include querying a database such as card database 132 to determine whether the greeting card is vertical, horizontal, or other configuration. In these embodiments, the database may include a field that indicates the configuration of the greeting card.

If in operation 204, the greeting card is a vertical greeting card (or should be treated as vertical greeting card), process 200 may include placing images of the front and inside of the card in a side-by-side layout in an operation 206. On the other hand, if the greeting card is not a vertical greeting card (or should be treated as a horizontal greeting card), process 200 may include placing an image of the front of the card on top of an image of the inside of the card in an operation 208. In some embodiments, process 200 may include obtaining front and inside images of the greeting card based on manual processing of the images using PHOTOSHOP or other image processing software based on one or more rules. The manually processed images may then be uploaded into a database such as card database 132.

In an operation 210, process 200 may include generating a composite rollover image that includes at least the front and inside image of the card laid out in operation 206 or 208. In some embodiments, process 200 may include obtaining front and inside images of the greeting card based on manual processing of the images using PHOTOSHOP or other image processing software based on one or more rules. The manually processed images may then be uploaded into a database such as card database 132. In an operation 212, process 200 may include generating captions for the rollover images. Captions may indicate the view or perspective (e.g., front, inside, back, etc.) being displayed by the rollover image or portion of the rollover image. For example, a rollover image having a composite of two views may be associated with or include two captions that each describe one of the two views.

In an operation 214, process 200 may include obtaining a message of a card. The message may include text that is written on the front, inside, back, etc., of the card. The obtained message may be associated with the view or perspective on which the message appears.

In an operation 216, process 200 may include determining a size of a rollover image based on various algorithms (or instructions). In some embodiments, operation 216 may include manually sizing the composite image using PHOTOSHOP or other image processing software and based on one or more algorithms. In an operation 218, process 200 may include determining a position of a thumbnail that represents a greeting card on the card selection interface 110.

In an operation 220, process 200 may include determining a position of a rollover image based on the determined position of the thumbnail. The position of the rollover image may also depend on the size of the thumbnail, size of the rollover image, size of the rollover canvas, size of available space on card selection interface 110, resolution of the screen of consumer device 140, and/or other factors.

In an operation 222, process 200 may include generating card selection interface 110 having the rollover images, thumbnails, and determined position, size, and layout of the images. In an operation 224, process 200 may include communicating card selection interface 110.

FIGS. 3-9 illustrate examples of card selection interfaces and elements thereof. The interfaces and elements illustrated in the drawing Figures are for illustrative purposes only. Various components may be added, deleted, moved, or otherwise changed so that the configuration, appearance, and/or content of the interfaces and elements may be different than as illustrated in the Figures. Accordingly, the graphical user interface objects as illustrated (and described in greater detail below) are exemplary by nature and, as such, should not be viewed as limiting. In the Figures, like numerals represent equivalent elements or features.

Card selection interface 110 may be implemented as a web page communicated from computer 120 to a client, an application such as a mobile application executing on the client that receives the interface from computer 120 or generates the interface based on information communicated from computer 120, and/or other interface. Whichever type of interface is used, computer 120 may communicate the data and/or formatting instructions related to the interface to the client, causing the client to generate the various interfaces and elements of FIG. 3 and other drawing Figures. Furthermore, computer 120 may receive data from the client via the various interfaces, as would be appreciated.

Figure 3:
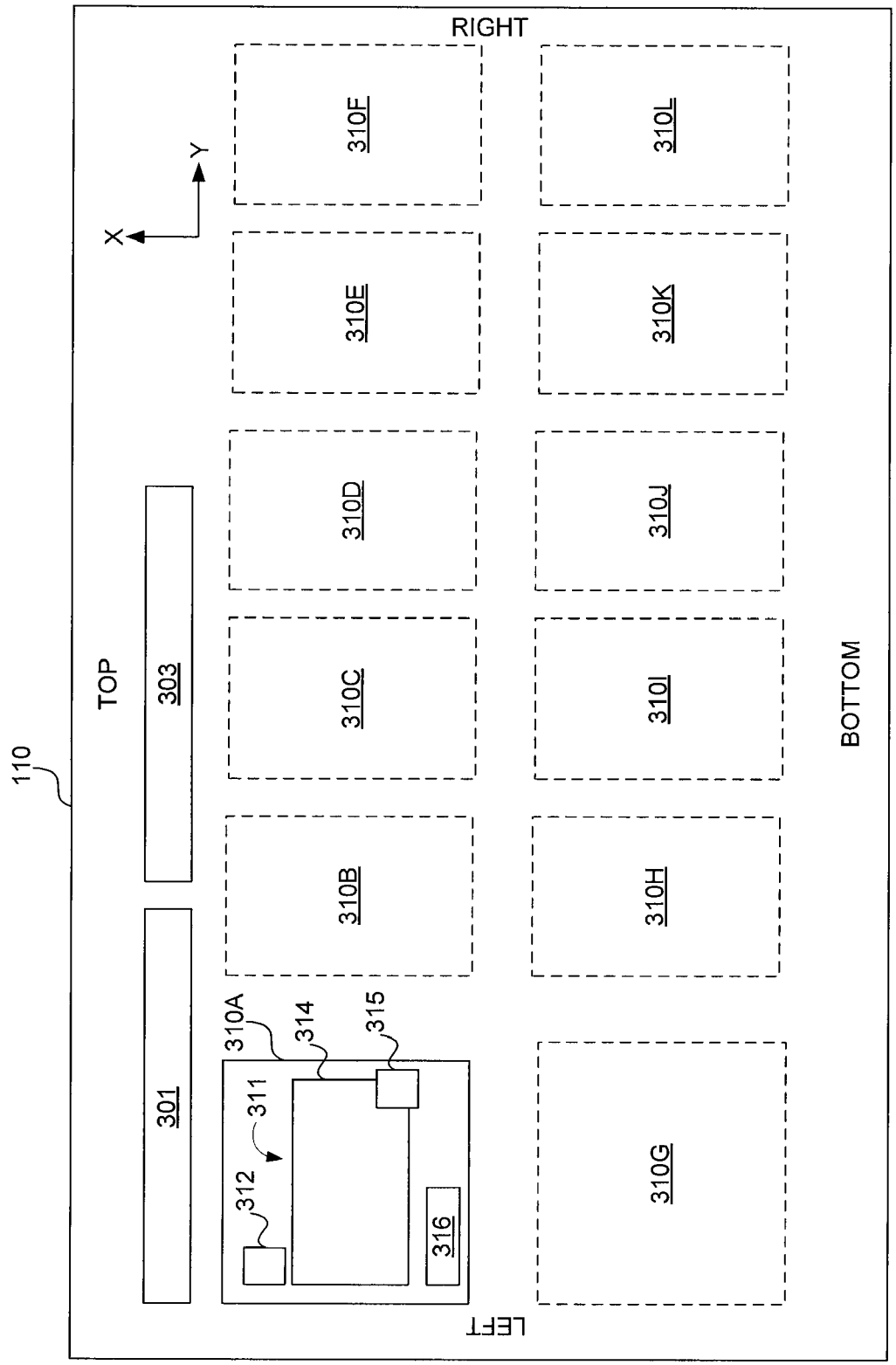
FIG. 3 illustrates an example of a card selection interface, according to an aspect of the invention.

Referring to FIG. 3, card selection interface 110 may include a navigation element 301, a search element 303, and one or more card ensemble elements 310 (illustrated in FIG. 3 as card ensemble elements 310A-310L). Navigation element 301 may include links or other controls that can navigate different interfaces. Search element 303 may be used to perform a search for greeting cards, input or select a category (e.g., "Birthday," "Anniversary," etc.) of greeting card, and/or perform other queries to retrieve greeting cards of interest.

In some embodiments, each card ensemble element 310 may include interface elements related to a corresponding greeting card. For example, a card ensemble element 310 may include a background 311, a highlight element 312, an image 314 of a greeting card, a quantity descriptor 315, an action element 316, and/or other elements related to a greeting card displayed by the card ensemble element.

In some embodiments, highlight element 312 may be implemented as a checkbox or similar interface element. When selected, highlight element 312 may cause the card ensemble element 310 to be highlighted and when de-selected, the highlighting may be removed. In some embodiments, highlighting may include changing an appearance of card ensemble element 310. For example, an appearance of background 311 may be changed such as by changing the color, adding cross-hatching, adding an icon, and/or otherwise changing background 311 and/or other portions of ensemble element 310 to distinguish highlighted card ensemble elements from non-highlighted card ensemble elements.

In some embodiments, image 314 may include a thumbnail or other image of a corresponding greeting card. In some embodiments, quantity descriptor 315 may indicate whether the greeting card is sold in boxed sets or otherwise in quantities greater than one. In some embodiments, the descriptor may indicate the quantity of cards in the set. For example, quantity descriptor 315 may include an icon, a graphic, text such as "Boxed" or "Assorted Box," and/or other indication that the greeting card is sold in boxed sets or otherwise in quantities greater than one, and quantity descriptor 315 may also indicate the quantity of cards in the set.

In some embodiments, action input element 316 may include various information and actions related to the card such as, without limitation, a size of the card, a price, a link to additional information associated with the card, a quantity input that indicates a quantity desired, an add to cart element that causes the greeting card to be added to a virtual shopping cart, and/or other elements.

Card ensemble elements 310B-310L are illustrated in shadow outline without detailed component listings for convenience, but each may include elements similar to card ensemble element 310A. Also illustrated for convenience is a "TOP," "LEFT," "RIGHT," and "BOTTOM" indicators that show an orientation of interface 300 as it is intended to be viewed by a user, as well as a X/Y axis legend.

Figure 4B:
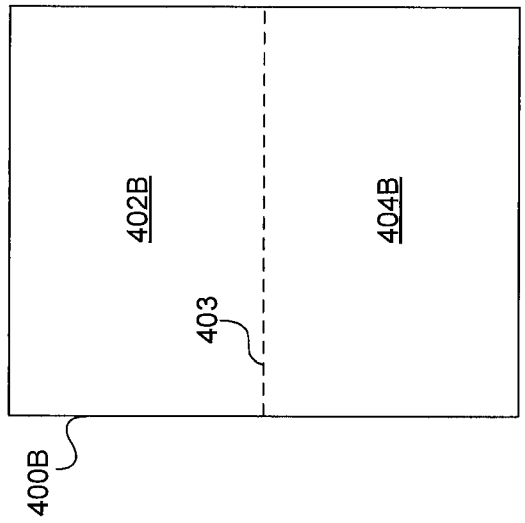
FIGS. 4A-C illustrate examples of rollover image layout, according to an aspect of the invention.
Figure 4A:
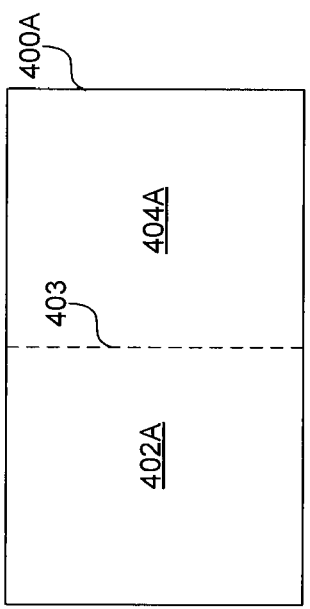
Figure 4C:
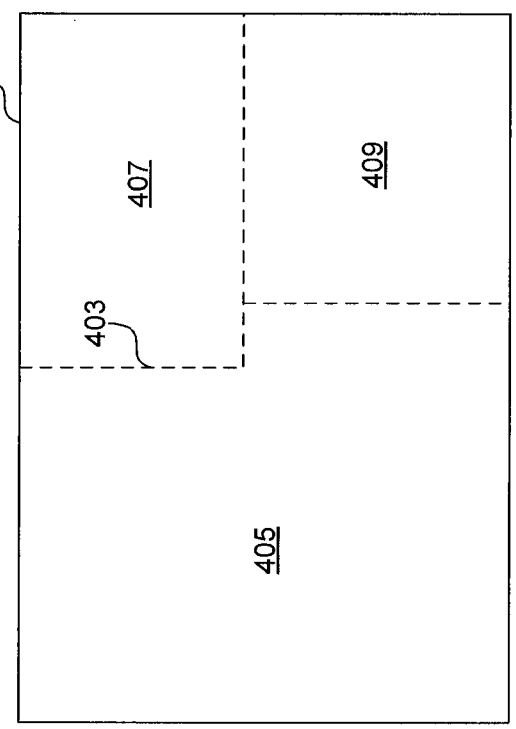

FIGS. 4A-4C illustrate rollover images 400 (illustrated in the Figures as 400A, 400B, and 400C), according to an aspect of the invention. Rollover image 400 may include a composite of two or more images or may include one or more separate images. As illustrated, rollover image 400 may include different sections 402, 404, 405, 407, and 409. Each section may represent an individual image that is part of a composite image or an individual image that is not combined as a composite with other images. An individual image may include an image of a front or other perspective/view of the greeting card being imaged. Divider 403 is an imaginary line illustrated for clarity and is not necessarily a feature of rollover image 400.

FIG. 4A illustrates a side-by-side layout of different section 402A and 404A. FIG. 4B illustrates a top-to-bottom layout of different sections 402B and 404B. FIG. 4C illustrates a free-form layout that includes sections 405, 407, and 409.

FIGS. 5A-5E illustrate a rollover image 400 that displays various views of a greeting card, according to an aspect of the invention. Although a side-by-side layout is illustrated in FIGS. 5A-5E, similar configurations may be used for top-to-bottom and free-form layouts as well.

Figure 5A:
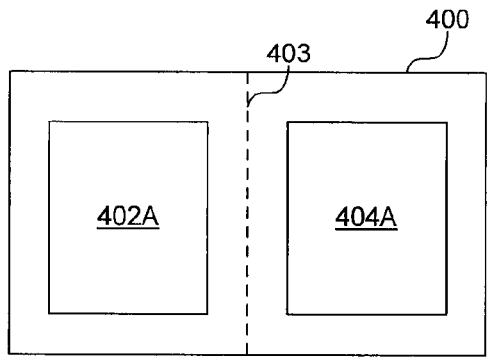
FIGS. 5A-E illustrate examples content included in a rollover image, according to an aspect of the invention.
Figure 5B:
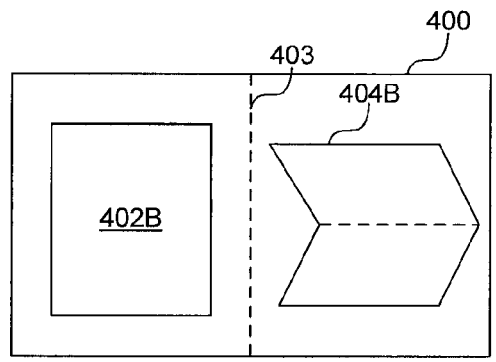
Figure 5C:
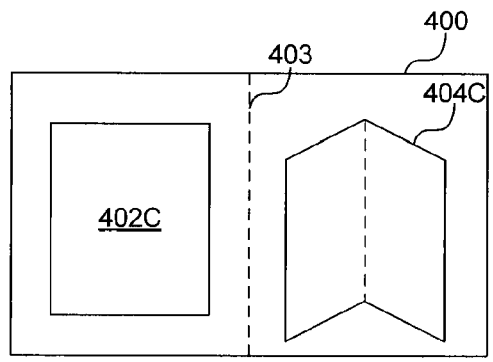
Figure 5D:
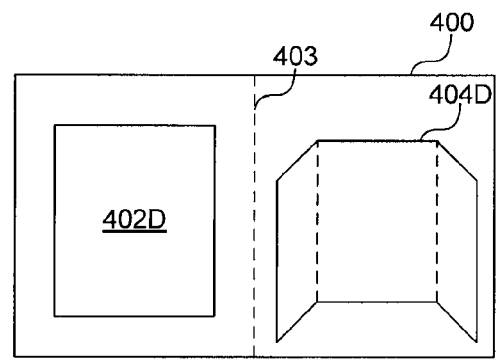
Figure 5E:
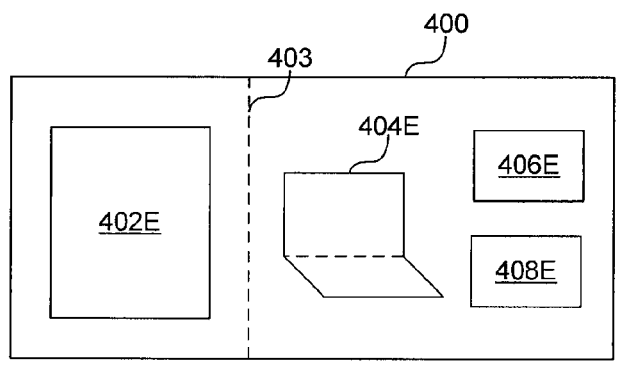

Referring to FIG. 5A, section 402A may include a front view of a greeting card while section 404A includes a partial inside view of a top, bottom, left, or right side of the greeting card. FIG. 5B illustrates a horizontal greeting card in which section 402B includes a front view of the greeting card while section 404B includes a full inside view of the greeting card. Although the full inside view in FIG. 5B and other drawing Figures may be illustrated as a perspective view, a flattened full inside view of the greeting card may be used. FIG. 5C illustrates a vertical greeting card in which section 402C includes a front view of the greeting card while section 404C includes a full inside view of the greeting card. FIG. 5D illustrates a trifold greeting card in which section 402D includes a front view of the greeting card while section 404D includes a full inside view of the greeting card. FIG. 5E illustrates a horizontal greeting card in which section 402E includes a front view of the greeting card while section 404E includes a full inside view of the greeting card, section 406E includes a back view of the greeting card and section 408E includes another view of the greeting card. Although the foregoing examples of section 402 describe a front view of the greeting card, each of sections 402, 404, 406 and 408 may include other views of the greeting card.

Referring to FIGS. 6A and 6B, in some embodiments, a rollover image 400 may be part of a rollover canvas 600, which may include a background 601. Background 601 may be colored or transparent. In order to help the consumer understand the view being illustrated, a caption 610 that describes the view may be included. Each caption may be positioned nearby and/or at least partially overlap a corresponding section.

FIG. 6A illustrates a rollover canvas 600 that includes a rollover image 400A in a side-to-side layout. Caption 610A describes that a "FRONT" view of the greeting card is being displayed in section 402A and a "INSIDE RIGHT" view of the greeting card is being displayed in section 404A. Other captions may include "INSIDE FULL," "INSIDE TOP," "INSIDE BOTTOM," "INSIDE BOTTOM," and/or other description that indicates the view being displayed. In some embodiments, the caption may indicate that the portion being view has no content. In these embodiments, the caption may include the indication "(BLANK)" or other description that indicates that the view of the card being displayed includes no content. FIG. 6B illustrates a rollover canvas 600 that includes a rollover image 400A in a top-to-bottom layout. Other layouts may be used as well.

FIGS. 7A and 7B illustrate a rollover canvas 600 having a rollover image 400 in a side-to-side layout and a top-to-bottom layout, according to an aspect of the invention. Other layouts may be used as well.

In some embodiments, rollover canvas 600 may include a message 720 that includes text that appears on the front or other view of the greeting card being displayed in section 402. Similarly, message 722 includes text that appears in a view displayed by section 404. In this manner, text content of the greeting card may be presented to the user even if the image of the view of the greeting card is unclear or too small to read. In some embodiments, messages 720 and 722 may be positioned within a corresponding section (as illustrated in FIGS. 7A and 7B), may at least partially overlap an image of the view of the corresponding sections, and/or be positioned in a manner that allows the customer to equate the message with the view of the greeting card being displayed.

FIGS. 8A-8G illustrate positioning of rollover canvas 600 relative to thumbnail ensemble 310, according to an aspect of the invention.

Referring to FIG. 8A, a center line 830 may bisect thumbnail ensemble 310, resulting in imaginary upper and lower halves that are equal in size. The center line 830 may be used to vertically center rollover canvas 600 such that center line 830 also vertically bisects rollover canvas 600.

Referring to FIG. 8B, if thumbnail ensemble 310 is too close to the top of card interface display 110 (or the top of the screen), the technique illustrated in FIG. 8A may cause rollover canvas 600 to be displayed at least partially off-screen. As such, the position of rollover canvas 600 may be adjusted downward so that the entire rollover image is displayed. Similar adjustments may be made if the thumbnail ensemble 310 is too close to the bottom of card interface display 110 (or the bottom of the screen) as illustrated in FIG. 8C.

Figure 8G:
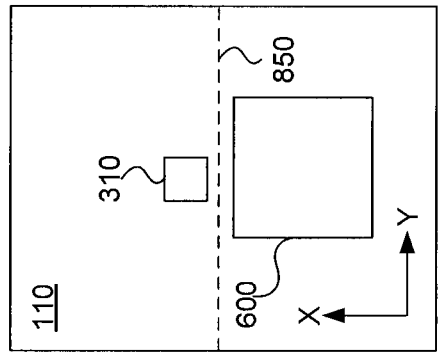
Figure 8F:
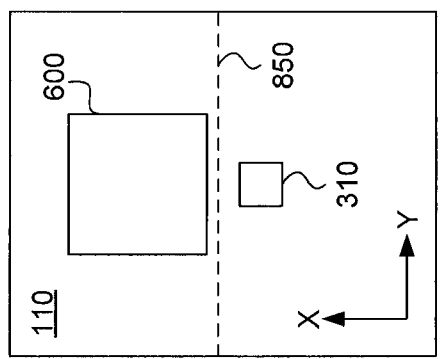
Figure 8E:
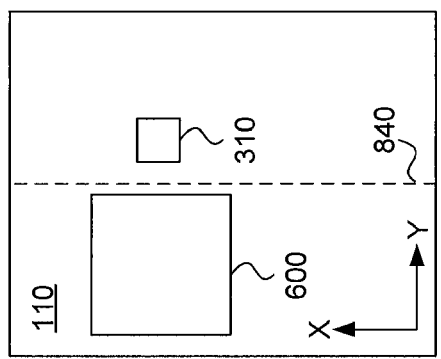
Figure 8D:
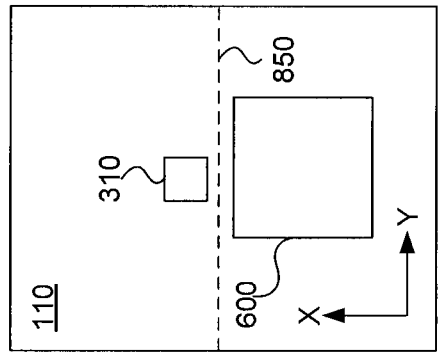

Referring to FIGS. 8D and 8E, rollover canvas 600 may be positioned to the left or right of thumbnail ensemble 310, depending on the position of thumbnail ensemble 310. For example, a center line 840 bisects card display interface 110 and results in imaginary left and right halves of card display interface 110 (or the screen) that are equally sized. As illustrated in FIG. 8D, if thumbnail ensemble 310 is positioned completely to the left of center line 840, then rollover canvas 600 may be positioned to the right of thumbnail ensemble 310. Similarly, as illustrated in FIG. 8E, if thumbnail ensemble 310 is positioned completely to the right of center line 840, then rollover canvas 600 may be positioned to the left of thumbnail ensemble 310.

If thumbnail ensemble 310 overlaps center line 840, then rollover canvas 600 may be positioned on the left or the right of thumbnail ensemble 310 depending on whether thumbnail ensemble 310 is more on the left half or the right half. If thumbnail ensemble 310 is equally in both halves, then the rollover canvas 600 may be positioned at the side in which the most recent rollover canvas was displayed to maximize continuity of the user experience.

Referring to FIGS. 8F and 8G, rollover canvas 600 may be positioned above or below thumbnail ensemble 310, depending on the position of thumbnail ensemble 310. For example, a center line 850 bisects card display interface 110 and results in imaginary top and bottom halves of card display interface 110 (or the screen) that are equally sized. As illustrated in FIG. 8F, if thumbnail ensemble 310 is positioned completely below center line 850, then rollover canvas 600 may be positioned above thumbnail ensemble 310. Similarly, as illustrated in FIG. 8G, if thumbnail ensemble 310 is positioned completely above center line 850, then rollover canvas 600 may be positioned below thumbnail ensemble 310.

If thumbnail ensemble 310 overlaps center line 840, then rollover canvas 600 may be positioned on above or below thumbnail ensemble 310 depending on whether thumbnail ensemble 310 is more on the top half or the bottom half. If thumbnail ensemble 310 is equally in both halves, then the rollover canvas 600 may be positioned at the side in which the most recent rollover canvas was displayed to maximize continuity of the user experience.

FIGS. 9A and 9B illustrate maximum size constraints for a rollover canvas, according to an aspect of the invention.

Referring to FIG. 9A, a thumbnail ensemble 310A that is positioned further from center line 840 may have a greater maximum width for a rollover canvas 600 than thumbnail ensembles 310B and 310C, which are closer to center line 840. In some embodiments, for a uniform shopping experience, the maximum size determined for rollover canvas 600C (e.g., the smallest determined maximum size) may be used for all canvases 600A-C.

Similarly, referring to FIG. 9B, a thumbnail ensemble 310A that is positioned further from center line 850 may have a greater maximum height for a rollover canvas 600 than thumbnail ensembles 310B and 310C, which are closer to center line 840. In some embodiments, for a uniform shopping experience, the maximum size determined for rollover canvas 600C (e.g., the smallest determined maximum size) may be used for all canvases 600A-C.

Although the Figures have generally been illustrated with a rollover canvas being positioned to the left, right, above or below a thumbnail ensemble, the rollover canvas may be positioned at other positions using principles described herein.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method of generating a card selection interface that allows shopping for greeting cards, the method being implemented in a computer that includes one or more processors, the method comprising:

obtaining, by the one or more processors, a thumbnail image of a greeting card and a rollover image of the greeting card, the rollover image comprising at least two views of the greeting card;

determining, by the one more processors, a position of the thumbnail image on the card selection interface and a position of the rollover image of the greeting card based on the position of the thumbnail image, wherein the rollover image appears at the position of the rollover image upon a hover over of the thumbnail image;

generating, by the one or processors, the card selection interface based on the thumbnail image, the rollover image, the position of the thumbnail image, and the position of the rollover image; and communicating, by the one or more processors, the card selection interface.

2. The method of claim 1, the method further comprising:
displaying, by the one or more processors, a layout of the at least two views of the greeting card based on whether the greeting card is a vertical card or a horizontal card.

3. The method of claim 2, wherein the at least two views comprise a front view of the greeting card and an inside view of the greeting card.

4. The method of claim 3, wherein the front view of the greeting card and the inside view of the greeting card are placed in a side-by-side layout when the greeting card is a vertical card.

5. The method of claim 3, wherein the front view of the greeting card and the inside view of the greeting card are placed in a top-to-bottom layout when the greeting card is a horizontal card.

6. The method of claim 1, the method further comprising:
determining, by the one or more processors, a size of the rollover image based on the position of the thumbnail image and the position of the rollover image.

7. The method of claim 1, the method further comprising:
determining, by the one or more processors, a maximum size of the rollover image based on the position of the thumbnail image, the position of the rollover image, and the space available on a remaining portion of the card selection interface.

8. The method of claim 7, the method further comprising:
applying, by the one or more processors, the maximum size of the rollover image to at least a second rollover image associated with a second greeting card.

9. The method of claim 1, the method further comprising:
determining, by the one or more processors, a maximum height or a maximum width of the rollover image based on whether the greeting card is a horizontal greeting card or a vertical greeting card.

10. The method of claim 1, the method further comprising:
determining, by the one or more processors, that the position of the thumbnail image is within a particular distance from a top of a display screen or the card selection interface; and
adjusting, by the one or more processors, the position of the rollover image based on the determination that the position of the thumbnail image is within the particular distance.

11. The method of claim 1, wherein a square card is treated as a vertical card or a horizontal card.

12. The method of claim 1, the method further comprising:
determining, by the one or more processors, a boundary that encompasses an irregular card; and
determining, by the one or more processors, whether to treat the irregular card as a vertical card or a horizontal card based on the boundary.

13. A computer system of generating a card selection interface that allows shopping for greeting cards, the computer comprising:
a memory configured to store a thumbnail image and a rollover image of greeting card;
one or more processors configured by one or more computer program modules, the one or more computer program modules comprising:
an image capture module configured to:
obtain a thumbnail image of a greeting card and a rollover image of the greeting card, the rollover image comprising at least two views of the greeting card;
an image position module configured to:
determine a position of the thumbnail image on the card selection interface and a position of the rollover image of the greeting card based on the position of the thumbnail image, wherein the rollover image appears at the position of the rollover image upon a hover over of the thumbnail image; and
an interface module configured to:
generate the card selection interface based on the thumbnail image, the rollover image, the position of the thumbnail image, and the position of the rollover image, and
communicate the card selection interface.

14. The system of claim 13, the one or more program modules further comprising:
an image layout module configured to:
determine the at least two views of the greeting card based on whether the greeting card is a vertical card or a horizontal card.

15. The system of claim 14, wherein the at least two views comprises a front view of the greeting card and an inside view of the greeting card.

16. The system of claim 15, wherein the front view of the greeting card and the inside view of the greeting card are placed in a side-by-side layout when the greeting card is a vertical card.

17. The system of claim 15, wherein the front view of the greeting card and the inside view of the greeting card are placed in a top-to-bottom layout when the greeting card is a horizontal card.

18. The system of claim 13, the one or more modules further comprising:
an image sizing module configured to:
determine a size of the rollover image based on the position of the thumbnail image and the position of the rollover image.

19. The system of claim 13, wherein the image sizing module is further configured to:
determine a maximum size of the rollover image based on the position of the thumbnail image, the position of the rollover image, and the space available on a remaining portion of the card selection interface.

20. The system of claim 19, wherein the image sizing module is further configured to:
apply the maximum size of the rollover image to at least a second rollover image associated with a second greeting card.

21. The system of claim 13, wherein the image sizing module is further configured to:
determine a maximum height or a maximum width of the rollover image based on whether the greeting card is a horizontal greeting card or a vertical greeting card.

22. The system of claim 13, wherein the image position module is further configured to:
  determine that the position of the thumbnail image is within a particular distance from a top of a display screen or the card selection interface; and
  adjust the position of the rollover image based on the determination that the position of the thumbnail image is within the particular distance.

* * * * *